Dec. 15, 1942.  R. WARRENDER  2,304,975
BRAZING OR WELDING TONGS
Filed Sept. 6, 1941  2 Sheets-Sheet 1
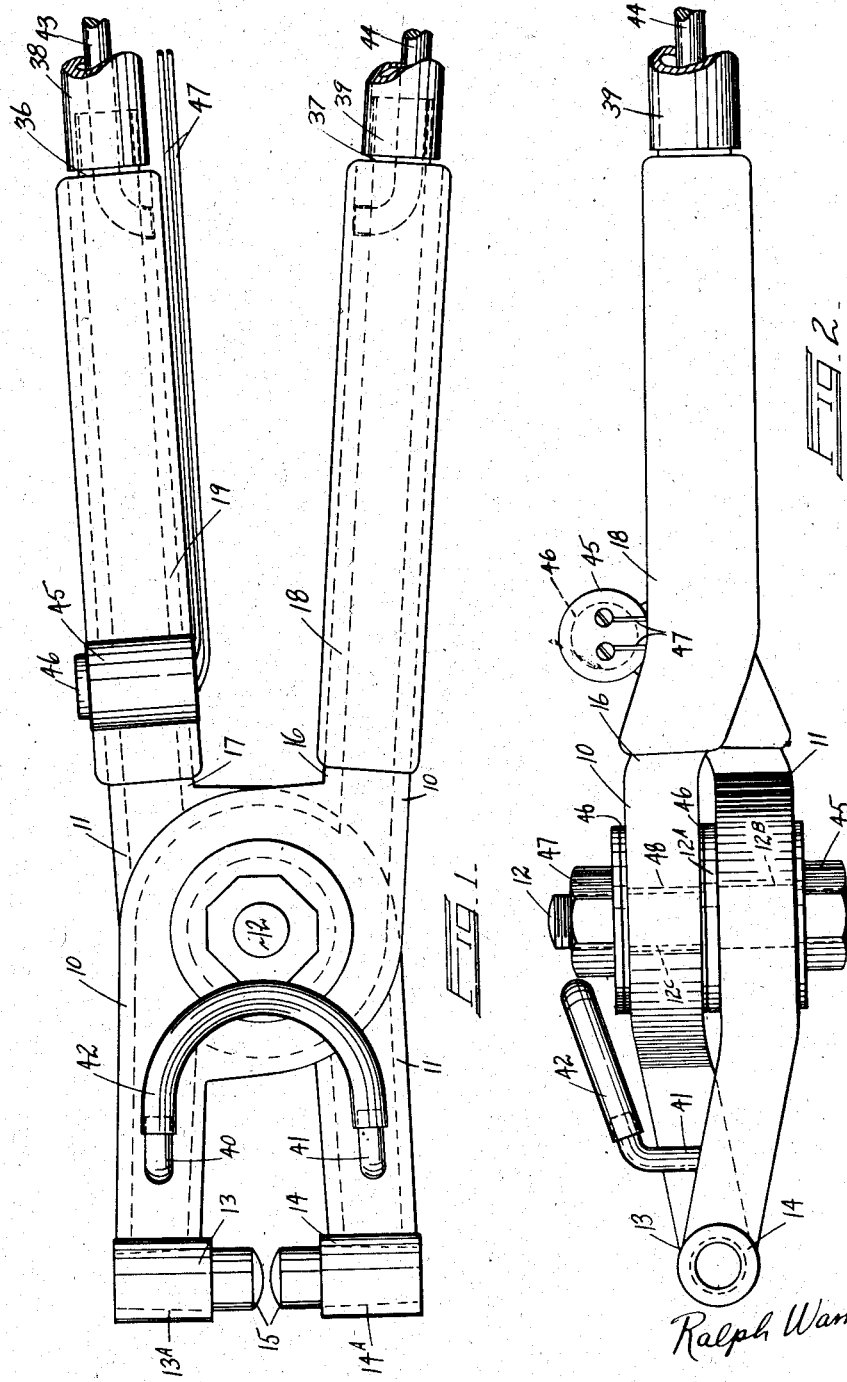
Ralph Warrender
Inventor,
W. B. Harpman
Attorney Dec. 15, 1942.    R. WARRENDER    2,304,975
BRAZING OR WELDING TONGS
Filed Sept. 6, 1941    2 Sheets-Sheet 2
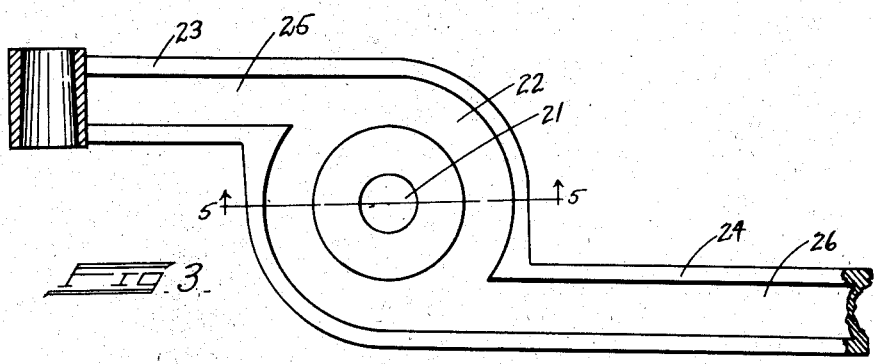
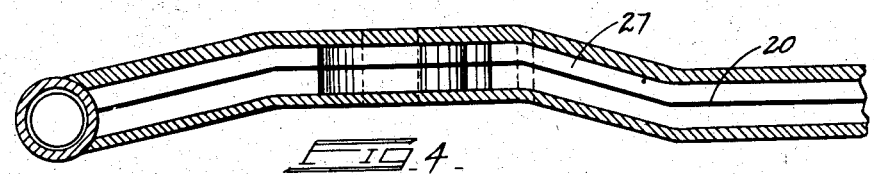
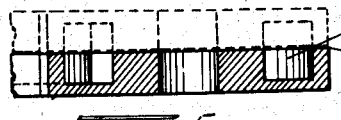
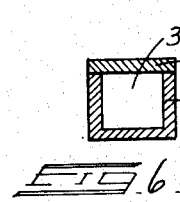
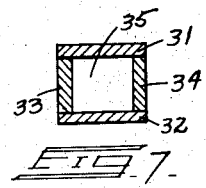
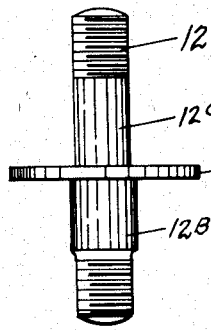
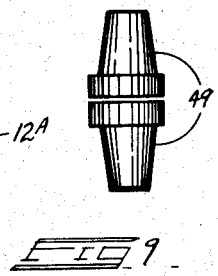
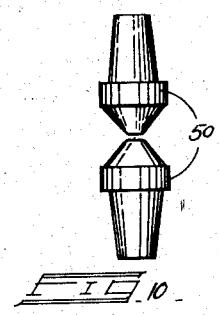
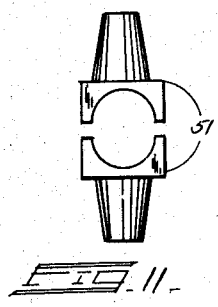
Ralph Warrender
Inventor,
By W. B. Harpman
Attorney Patented Dec. 15, 1942

2,304,975

UNITED STATES PATENT OFFICE 2,304,975

BRAZING OR WELDING TONGS

Ralph Warrender, Sharon, Pa.

Application September 6, 1941, Serial No. 409,800

4 Claims. (Cl. 219—4)

This invention relates to brazing or welding tongs and more particularly to such a device equipped with interchangeable electrodes for brazing or electric welding use, the device being of portable nature in the form of a conveniently operated pliers or tongs.

The principal object of the invention is the provision of brazing or welding tongs of a portable nature particularly adapted for use upon light work which may be more or less inaccessible or is otherwise of a character as not to be easily handled by stationary welding equipment well-known in the art, or may be subject to damage by brazing flames.

A further object of the invention is the provision of a pair of brazing or welding tongs suitable for brazing together sections of flexible metal structures, such as wire or ribbon, and such as may be commonly encountered in the formation of a transformer, as for example, in the connection of the taps thereof to the windings thereof.

A further object of the invention is the provision of brazing or welding tongs so formed as to be structurally strong and to permit a circulation of a cooling agent therethrough.

A still further object of the invention is the provision of a pair of brazing or welding tongs formed of a rolled copper structure and thereby having the advantages of being strong due to the closer grain structure of the metal and at the same time forming an extremely efficient electrical conductor.

The brazing or welding tongs shown and described herein are intended for use primarily in the formation of electrical articles such as transformers and particularly in the connections therein necessary, thereby avoiding the heretofore necessary use of stationary welding equipment, and conventional brazing torches, thereby obviously avoiding the objectionable flame heretofore necessary in brazing portions of transformers together, which flame frequently causes undesirable damage to the insulation necessarily present in transformer construction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein:

Figure 1 is a top plan view of the brazing or welding tongs.

Figure 2 is a side elevation of the brazing or welding tongs.

Figure 3 is a top plan elevation with parts broken away of a structural member used in forming one of the members of the tongs and illustrates the channel formation therein.

Figure 4 is a cross-sectional side elevation with parts broken away of one of the members of the tongs illustrating the formation thereof.

Figure 5 is a cross-sectional elevation taken on lines 5—5 of Figure 3.

Figure 6 is a cross-sectional elevation of an optional form construction of one of the members of the tongs.

Figure 7 is a cross-sectional elevation of an optional form construction of one of the members of the tongs.

Figure 8 is a side elevation of a pivot bolt forming the connection between the members of the tongs.

Figure 9 is a side elevation of a pair of interchangeable carbon electrodes such as may be used in the tongs for brazing work.

Figure 10 is a side elevation of a pair of molybdenum electrodes adapted for use in the tongs for welding work.

Figure 11 is a side elevation of a pair of carbon electrodes having grooves formed in their opposing surfaces capable of being used in the tongs in brazing copper tubes to one another.

By referring to the drawings and to Figures 1 and 2 in particular, it will be seen that a pair of brazing or welding tongs are illustrated which together with their formation comprise the invention herein set forth. In Figure 1 tong members 10 and 11 are pivoted to one another by means of a pivot bolt 12, jaw members 13 and 14 are formed on the tong members 10 and 11 respectively and are so formed as may be seen by referring to Figure 2 of the drawings, as to terminate upon a common axis and are provided with means for the reception of interchangeable electrodes 15, the electrodes 15 being adapted to engage the work to be united as in a brazing or welding operation. In order that the tong members 10 and 11 may be conveniently used, practically shaped handles 16 and 17 form parts of the members 10 and 11 respectively and are in turn provided with suitably insulated coverings as illustrated at 18 and 19 respectively. It will thus be seen that the tongs comprise a plier like structure wherein the members 10 and 11 pivot about an axis formed by the pivot bolt 12 and which tongs provide a convenient and practical means of effecting welding or brazing operations. As may be seen, by referring to Figures 3, 4, and 5 of the drawings, each of the tong members 10 and 11 comprises a structural shape formed of a pair of opposed channel like forms of rolled copper, which forms, as best illustrated in Figures 4 and 5 of the drawings, are placed in opposed relation and brazed to one another as indicated by the brazed joint 20 in Figures 4 and 5.

By referring now to Figure 3 of the drawings, it will be seen that in order to form the tongs a flat section of rolled copper has been drilled to provide an opening 21 and milled to provide a circular channel 22 and that the projecting sections 23 and 24 forming the jaw and handle portions respectively are milled to provide channels 25 and 26 which connect with the channel 22 and thus form a continuous channel through the member. When a pair of such members are placed in opposed relation as shown in Figures 4 and 5 and brazed together, a member is formed such as indicated by numerals 10 or 11, in Figures 1 and 2 wherein a continuous channel is provided as indicated by the dotted lines in those figures.

It is obvious that several optional forms of construction will be apparent to those skilled in the art and two such forms are illustrated in Figures 6 and 7 of the drawings. In Figure 6, a channel member 28 has been brazed to a flat member 29 to form a tong member having a suitable channel therein as indicated by the numeral 30. In Figure 7, four sections comprising top and bottom sections 31 and 32 respectively, are brazed to side sections 33 and 34 respectively to form a channel 35.

By again referring to Figures 1 and 2 of the drawings, it will be seen that the brazing or welding tongs formed in accordance with the structural formation herein given constitute extremely strong structural members which are provided with continuous channels therein through which a cooling agent may be circulated. In order that the cooling agent may enter the handle portion 17 of the tong member 11, a hollow circular extension 36 is provided at the outer-most end of the handle and a similar structure is indicated by the numeral 37 as being formed as a part of the handle member 16. These hollow circular extensions form in effect, tubular connections with the channels in the tong members and are adapted to receive suitable fluid conducting hose as indicated by the numerals 38 and 39 respectively. In order that cooling fluid introduced, for example, through the hose 38 into the channel within the tong member 11 may reach the other tong member 10, a pair of tubular connections 40 and 41 are formed on the tong members 10 and 11 respectively adjacent the jaw ends 13 and 14 and communicate with the channel therein and are in turn interconnected with a relatively short section of suitable hose 42 so that the cooling fluid flowing through the tong member 11 passes through the hose 42 and enters the tong member 10 from whence it leaves through the hose 39.

The hose connections 38 and 39 also serve the additional purpose of providing insulating channels through which flexible electrical cables 43 and 44 approach the tongs from the necessary transformer by means of which suitable welding or brazing current is applied. As such a transformer and the necessary control circuit are well-known in the art, the same are not further described in this disclosure other than the showing of a control circuit switch 45 a push button 46 of which, when depressed, completes a circuit through a pair of wires 47 which in turn are adapted to be electrically connected to a contactor which in turn controls the transformer circuit. The switch 45 is located in a position upon the handle 17 of the tongs for convenient thumb operation by the user.

Several forms of connections are obviously possible as concerns the transformer ends of the hose 38 and 39 and cables 43 and 44 therein, wherein the cooling agent is separated from the cable which is attached to the transformer. At the tong ends of the cables 43 and 44 they are preferably affixed to the tong members themselves as, for example, may be conveniently accomplished by providing an opening in the handle member and inserting the cable therein and brazing the same in that position thereby forming a positive electrical connection between the cable and the tong member itself. By referring again to Figures 1 and 2 of the drawings and to the pivot bolt 12 shown in position therein, it will be observed that the tong member 11, as shown in lower-most position in Figure 2, is positioned upon the lower-most portion of the bolt 12 immediately beneath an annular flange 12A, which flange in cooperation with a washer and nut 45 serves to hold the tong member 11 in movable position on the said bolt 12. By referring also to Figure 8 of the drawings wherein a side elevation of the bolt member 12 may be seen, it will be observed that the portion 12B thereof provides for the bearing of the member 11 thereagainst. Again referring to Figure 2, it will be seen that the tong member 10 is also positioned on the bolt 12 although over a smaller section thereof as indicated at 12C in Figure 8, and that a pair of insulating washers 46, preferably formed of mica, insulate and space the tong member 10 apart from the annular flange 12A of the bolt 12 and from a washer and nut 47 positioned upon the uppermost end of the bolt 12. An insulating sleeve shown in dotted lines and indicated by the numeral 48 is positioned about the portion 12C of the bolt 12 to effectively insulate the bearing surface of the tong member 10 from the bolt 12. It will thus be seen that the member 10 is insulated from the bolt 12, its annular flange 12A and the nut and washer 47 and that the tong member 11 pivots about the lower portion 12B of the bolt 12 in no way in electrical connection with the member 10.

Still referring to Figures 1 and 2 of the drawings and particularly to the jaw portions 13 and 14 thereof, it will be observed that the jaw portions are formed of separate structures brazed to the ends of the tong members 10 and 11 and that these jaw portions 13 and 14 are provided with tapered openings 13A and 14A which are adapted to receive in a removable manner the electrodes 15 as shown in Figure 1. These electrodes shown are formed of copper and are adapted for welding light gauge steel materials to one another. By removing the copper electrodes 15 and replacing them with carbon electrodes 49, as illustrated in Figure 9 of the drawings the tongs are useful as a brazing tool in brazing, for example, copper to copper. The carbon electrodes 49 provide sufficient resistance to the flow of current to create sufficient heat for brazing purposes. In Figure 10 a pair of electrodes 50 are shown formed of molybdenum which electrodes would be used in the tongs for welding copper to copper. In Figure 11 of the drawings a pair of carbon electrodes having oppositely disposed grooves formed in their work engaging surfaces provide for the brazing of copper tubes which copper tubes can be joined end to end by providing beveled joints thereon, so that one tube slides partially within the other, such brazing being done by applying a coat of brazing material to the ends, bringing them together, and then bringing the electrodes 51 into engagement immediately over and under the joint, the flow of current through the electrodes providing sufficient heat to braze the tubes together while the readily controlled pressure of the tongs insures against the collapsing of the copper tubes during this operation.

It will thus be seen that a pair of brazing or welding tongs have been shown and described which tongs are of a unique structure in the art and which structure makes possible the efficient use of the tongs. Their formation from rolled copper imparts to them a structural strength not found in any other form of construction and their channeling provides for the continuous circulation of a cooling agent through them at all times. In use as for example, in brazing wires to terminals in transformer construction; cables to strap; and cables to cables, they become a highly efficient tool. They are likewise useful in brazing cables to turns on transformers to form taps thereon and in uniting bars wherein an appropriate joint is used. In welding they are useful in assembling metal articles and they are extremely convenient and practical in operation.

The brazing or welding tongs are relatively simple in construction as the formation of their component parts is readily accomplished by milling cutters, it being only necessary to bend the component parts into appropriate form and unite them through a brazing operation to form a tong member heretofore described.

Having thus described my invention, what I claim is:

1. A brazing or welding tool comprising a pair of tongs having jaw portions and handles formed thereon, means for retaining removable electrodes in the said jaw portions and insulating means formed about the said handle portions, the said tongs comprising a pair of conducting members each of which comprises a circular body having a jaw and a handle formed thereon in approximately oppositely disposed relation, the said conducting members being pivotally affixed to one another and insulated from one another by means of suitable insulation, channels formed in each of the said members adapted to receive a cooling agent and interconnecting means positioned between the said members adapted to permit the circulation through the members of the cooling agent, together with means establishing connections between the handles and a suitable source of electrical current.

2. A brazing or welding tool consisting of a pair of tongs comprising a pair of conducting members forming two jaws and handles therefor, each of the said conducting members comprising a circular body having a jaw and a handle formed thereon in approximately oppositely disposed relation, means formed in the said jaws adapted to receive interchangeable electrodes, a common pivot connecting the said handles, insulation spaced between one of the said handles and the said pivot so as to insulate the one handle from the other, channels formed in the said handles and jaws and in the tongs about the said pivot adapted to receiving a cooling agent, means for introducing a cooling agent into the said tongs through one of the said handles and means connecting the said tongs together adjacent the said jaws so as to provide for the circulation of the cooling agent therethrough.

3. A brazing or welding tool consisting of a pair of tongs comprising a pair of conducting members forming two jaws and handles therefor, each of which comprises a circular body having a jaw and a handle formed thereon in approximately oppositely disposed relation, electrodes positioned in the said jaws, a common pivot connecting the said handles, insulation between one of the said handles and the said pivot and between the said handle and the other handle so as to insulate one from the other, each of the said jaw and handle members comprising a structural member formed of a pair of oppositely disposed channeled members so as to provide a circulatory system and means for introducing a cooling agent into the said circulatory system and conducting the same therefrom, together with suitable electrical connections attached to the said handles, the said tongs comprising electrical conductors.

4. In a brazing or welding tool consisting of a pair of tongs, each of the said tong members comprising a pair of channeled structural members formed of flat rolled stock and brazed in oppositely disposed relation to form the tong member and having a channel therein for the circulation therethrough of a cooling agent, each of the said tong members comprising a circular body having approximately oppositely disposed jaw and handle portions formed thereon, openings in the said circular portions through which a common pivot may be passed and insulated therefrom.

RALPH WARRENDER.